Dec. 7, 1971  G. VAN DER VEKEN  3,624,954
COMBINED BOX AND CONSTRUCTION TOY, INCLUDING CONNECTING MEANS
Filed Sept. 19, 1969  5 Sheets-Sheet 1

INVENTOR.
GERMAINE VAN DER VEKEN
BY
Bacon & Thomas
ATTORNEYS

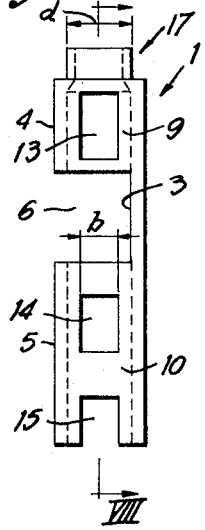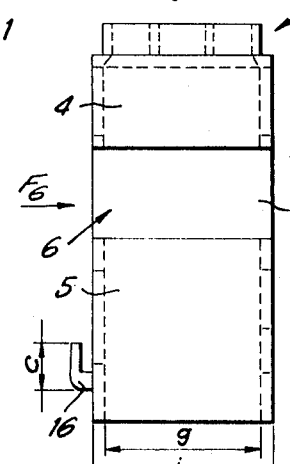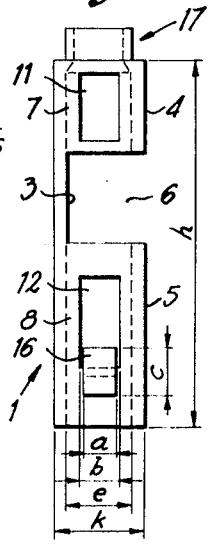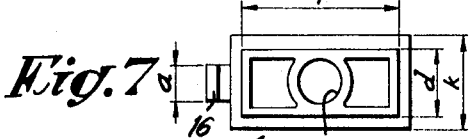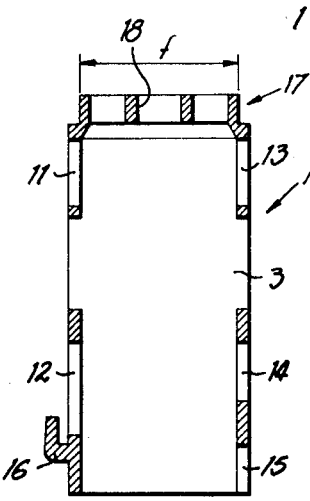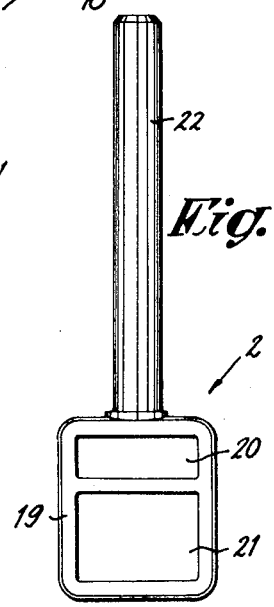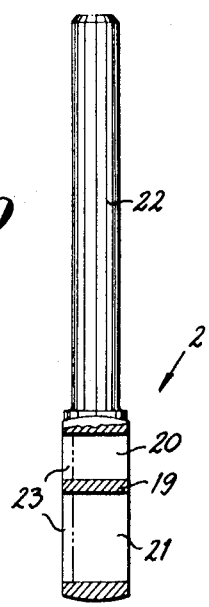

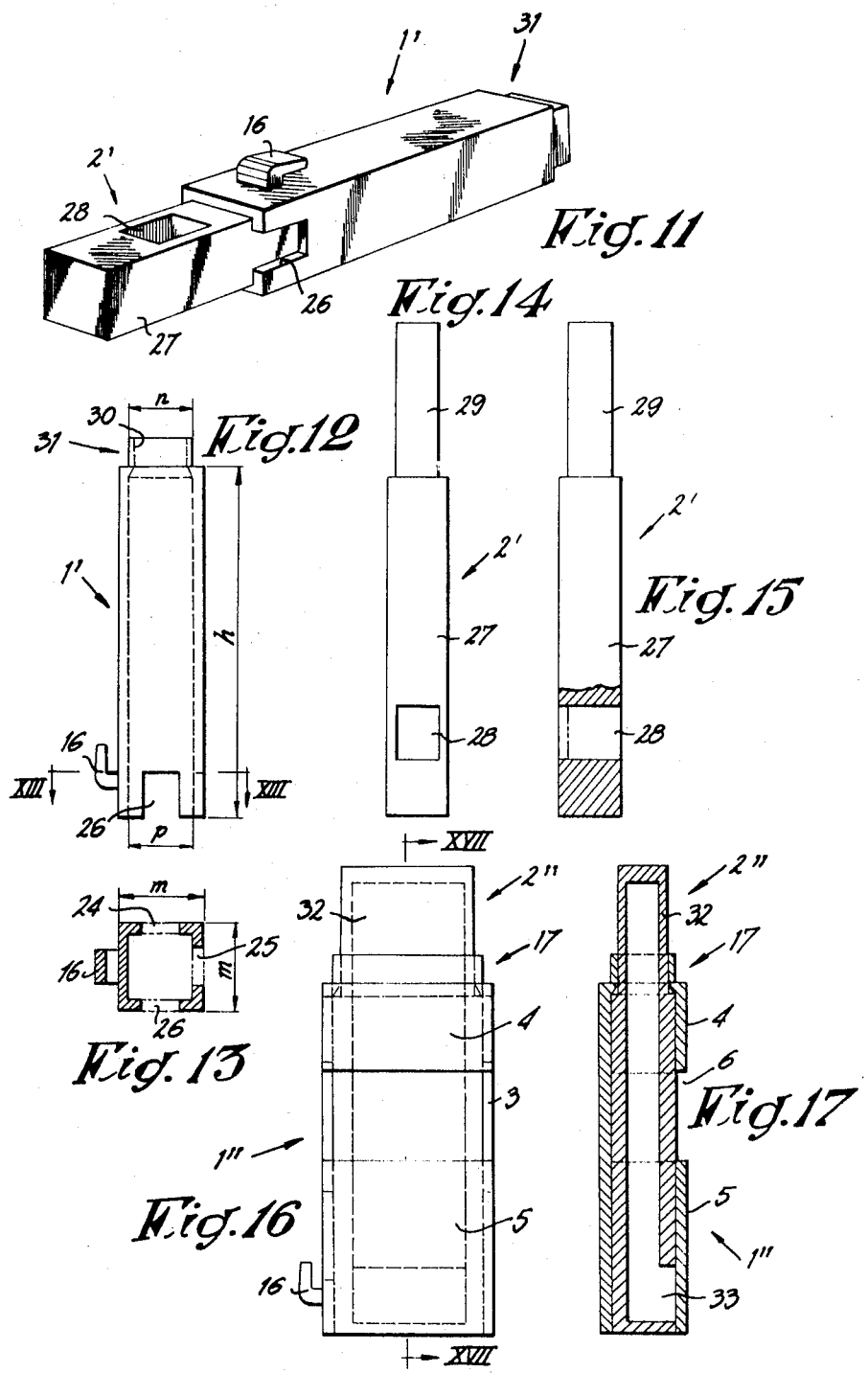

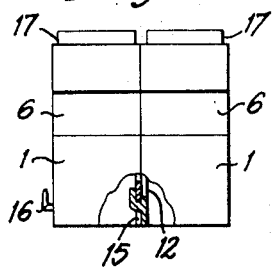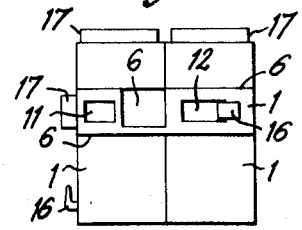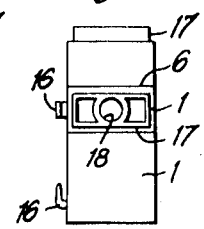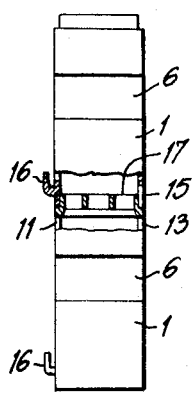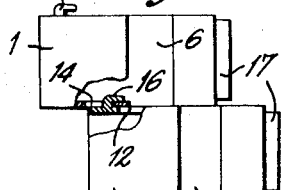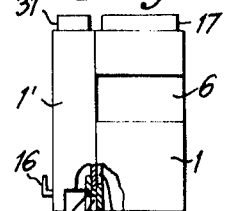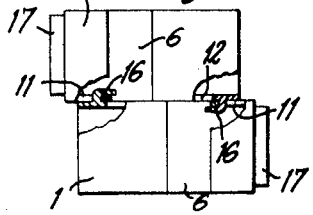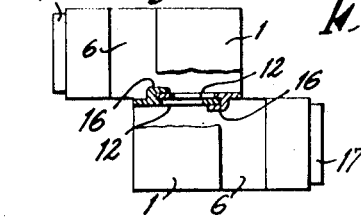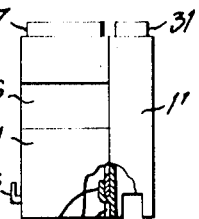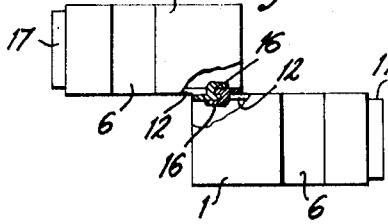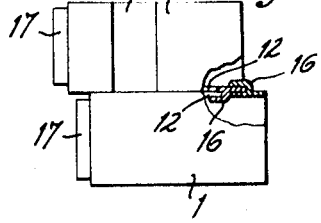

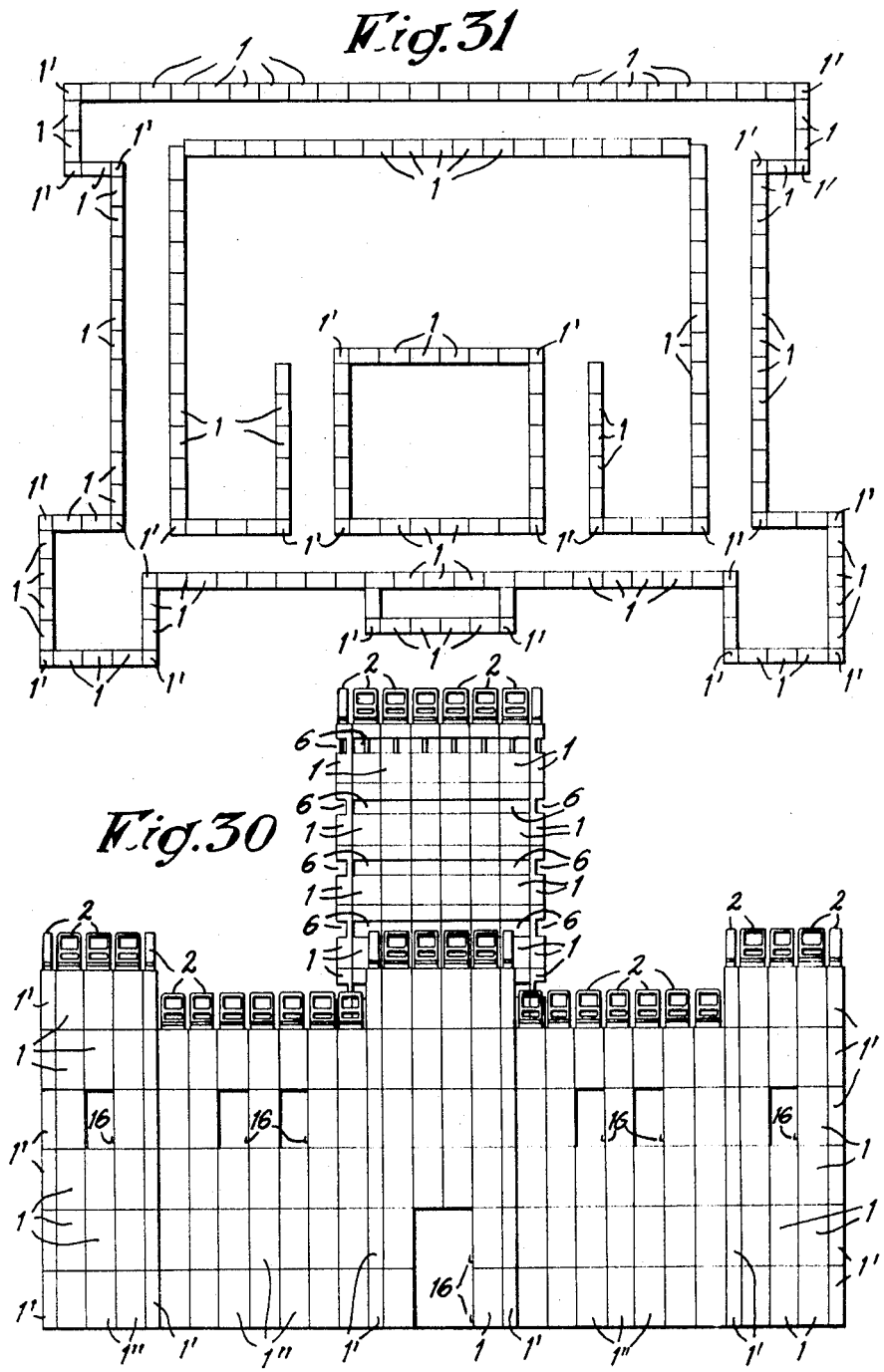

United States Patent Office 3,624,954
Patented Dec. 7, 1971

3,624,954
COMBINED BOX AND CONSTRUCTION TOY, INCLUDING CONNECTING MEANS
Germaine van der Veken, Vrijheidslaan 171,
Brussels 8, Belgium
Filed Sept. 19, 1969, Ser. No. 859,456
Int. Cl. A63h 33/08
U.S. Cl. 46—11                                 3 Claims

ABSTRACT OF THE DISCLOSURE

A combined box and toy is formed with a transverse slot into which the sidewalls of another box may be inserted. A hook carried by the sidewall of one box is adapted to be hooked onto the sidewall of an adjacent box at the transverse slot or at an aperture formed in one of the sidewalls of the adjacent box.

---

The present invention is concerned with a new conception of wrapping which, besides its function of wrapping and possibly dividing into doses, contributes to the promotion of the sale of the product respectively wrapped and divided into doses.

Aforementioned sale's promotion is based on the fact that these new wrappings, after their normal use, or respectively after having been emptied, form a connecting element or an assembly element for the erection of all sorts of constructions with an entertainment and/or didactic character, more particularly for children.

The wrapping according to this invention can be used for the distribution of all sorts of products, amongst others for household use, such as coffee, tea, chocolate in powdered form or in tablets, milk, sugar, cleaning products, meat extracts and suchlike, all sorts of cooking ingredients such as spices, composite elements for the preparation of gravies, meat juice, soup or suchlike; confectionery products; colouring products, perfumery and toilet articles; in general all products or objects in one single piece, in parts, in powder form or in liquid condition.

The wrapping according to the present invention shall be fabricated of some resistant material, in general, although not exclusively, of a plastic material, which offers the possibility of an air-tight wrapping.

For this purpose the wrapping according to the present invention is mainly characterized by a combination of at least one outer body; in the latter a drawer, possibly partitioned; connected to aforesaid drawer a control element for displacing aforesaid drawer in aforesaid body; as part of aforesaid body, hollow parts and protruding parts, in such a manner that each wrapping forms an assembly element by the co-operation of aforesaid hollow and protruding parts of such wrappings placed adjacent to each other.

A wrapping which is more or less similar to the wrapping of the present invention, but which is however not conditioned for the above described application but which is specifically provided for transferring a product, liquid or suchlike into a liquid, is described in the patent application Ser. No. 859,308 by the same applicant.

In order to indicate more clearly the characteristics of the present invention, a few preferential forms of embodiment will be described hereafter, merely as examples and without the slightest limiting character, with reference to the appended drawings in which:

FIG. 4 shows a front view of the outer wrapping element of the wrapping according to FIGS. 1 to 3;

Figure 1:
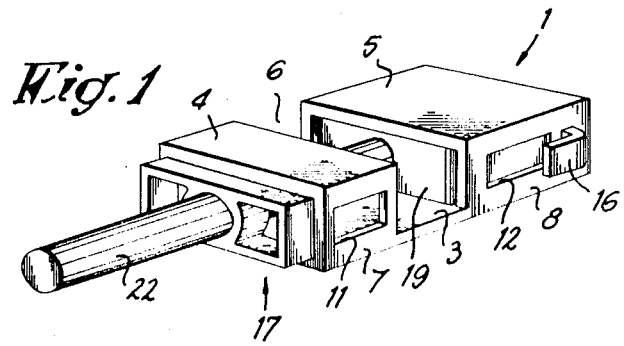
FIG. 1 represents a perspective view of a wrapping according to the present invention, in closed condition.

FIGS. 5 and 6 respectively show views according to arrows $F_5$ and $F_6$ in FIG. 4;

FIG. 7 is a top view of FIG. 4;

FIG. 8 is a cross-section according to line VIII—VIII in FIG. 5;

FIG. 9 shows a front view of the inner wrapping element according to the present invention;

FIG. 10 is a side view with partial cross-section of FIG. 9;

FIG. 11 shows a perspective view of an alternative form of embodiment of the wrapping according to FIGS. 1 to 10;

FIG. 12 shows a side view of the outer wrapping element according to FIG. 11;

FIG. 13 is a cross-section according to line XIII—XIII in FIG. 12;

FIG. 14 shows a front view of the inner wrapping element as used in the embodiment according to FIG. 11;

FIG. 15 shows a side view of FIG. 14;

FIG. 16 shows a front view of a second alternative form of embodiment of a wrapping according to the present invention;

FIG. 17 is a cross-section according to line XVII—XVII in FIG. 16;

FIGS. 18 to 29, show various possibilities of assembling the outer wrapping elements of a wrapping according to the present invention, whereby use is made of two or more of the elements shown in FIGS. 1 to 17;

FIG. 30 shows a front view of a building construction, for instance a fort, obtained by respectively assembling and interconnecting wrapping elements of wrappings such as shown in the previous figures and FIG. 31 shows a schematic top view of FIG. 30.

As shown in FIGS. 1 to 10, the wrapping according to the present invention mainly consists of an outer body 1 which forms the casing of the wrapping and a drawer 2, which may or may not be partitioned, in which the products may be deposited which have to be wrapped.

The outer body 1 consists in this embodiment mainly of a hollow parallelepiped body with one complete large side wall 3, whilst the second large side wall consists of two parts, respectively 4 and 5, which are separated from each other by a space 6.

The small side walls of body 1 in this case are also made-up of two parts, respectively 7 and 8 on the one hand, and 9 and 10 on the other hand, whereby these parts are also separated from each other by aforesaid space 6.

In each of these parts 7, 8, 9 and 10 of the smaller side walls of body 1 openings are provided, respectively 11, 12, 13, 14 and 15, whilst on one short side wall, in the present case on part 8 of one of the walls, a hook-shaped element 16 is provided.

The width $a$ of the centrally located hook-shaped element 16 is equal to or slightly smaller than the width of each of aforesaid openings 11 to 15, whilst the length $c$ of element 16 is in any case smaller than the length of the smallest opening 11 to 15. Provision is also made for the length $c$ of this element 16 to be smaller than the width of space 6 which is provided in the body.

At one extremity aforesaid body 1 is completely open, whilst in this embodiment body 1 is provided at its other extremity with an extension 17 containing a guiding element 18 for the inner wrapping element.

In this form of embodiment and by reference the width $d$ of extension 17 shall be equal to or slightly smaller than the internal width $e$ of outer body 1, whilst the width $f$ of extension 17 shall be equal to or slightly smaller than the inner width $g$ of body 1.

The internal element or drawer 2 which can co-operate with the aforementioned parallelepiped body 1 consists in the present form of embodiment mainly of the drawer itself 19 in which one or several traversing openings, in the present case two, respectively 20 and 21, are provided so as to obtain two cavities with a predetermined capacity.

The actual drawer 19 is in this case extended by a control rod 22 which co-operates with a sliding fit into aforesaid passage 18 of the parallelepiped body 1.

The width and the thickness of drawer 19 are such that this drawer can be displaced in parallelepiped body 1 with a more or less tight sliding fit, more particularly so in the part which is delimited by walls 5, 8 and 10, so as to obtain that when one or more products, even liquid products, are deposited in such a drawer, these products can be wrapped in an air-tight manner.

It is quite obvious, as shown schematically in FIG. 10, that such a drawer 19 may also be provided with a bottom 23.

It is also obvious that in order to be able to maintain drawer 19 in various positions with respect to outer body 1, notches or suchlike, not shown, can be provided in rod 22 and/or in drawer 19, which can then co-operate with protrusions or suchlike provided in the appropriate locations of body 1.

In this manner a wrapping is obtained for all sorts of solid, powdered, liquid or other products, which can be deposited in an appropriate manner in such a wrapping.

It shall indeed be preferable, when use is made of solid products, to use a drawer with a bottom 23 so as to be able to place these products in a simple manner in such a drawer, whereby in one single wrapping, a single products, or two or several products can be placed, depending respectively upon the use it is intended to make of such a wrapping and upon the number of cavities into which the drawer is divided.

Figure 2:
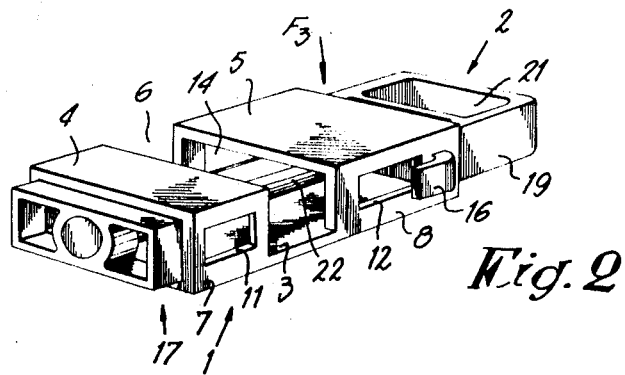
FIG. 2 is a similar view to that of FIG. 1, but in which the wrapping is shown it its open condition.
Figure 3:
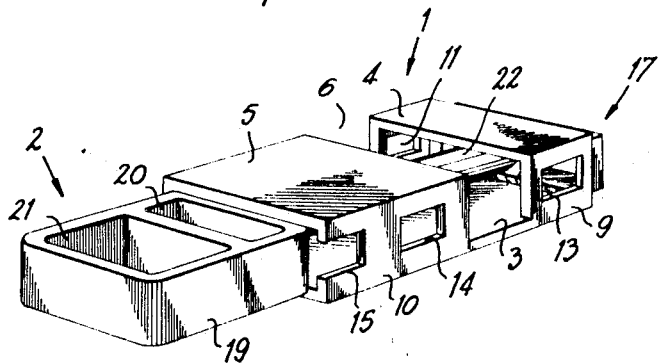
FIG. 3 is a perspective view according to arrow $F_3$ in FIG. 2.

When liquid or doughy products are wrapped, it will in most cases be sufficient to provide traversing openings in drawer 19, whereby the wrapping itself can take place under the liquid level by merely immersing the apparatus shown in FIGS. 1 to 3, or more specially in the position shown in FIGS. 2 and 3, into the liquid until the actual drawer 19 is under the liquid level, after which body 1 can be pushed down with respect to the drawer so as to seal-off the liquid which is imprisoned in the drawer. In this manner it is of course also possible to introduce products in powder form in drawer 19.

In order to remove such products, it is possible for instance, when contact with the air is undesirable, to proceed in the inverse manner.

A further particularity of the embodiment as shown in FIGS. 1 to 10 consists in the fact that the height $h$ of the parallelepipedic outer body 1 shall be chosen in such a manner as to be a multiple simultaneously of with $j$ and of thickness $k$ of such an element $l$.

In FIGS. 11 to 15 an alternative form of embodiment is shown of a wrapping according to the present invention, whereby the outer body is in this case made-up of a parallelepipedic body 1' with square cross-section, whereby aforesaid protrusion 16 is provided on at least one side, whereby preferably the three other sides and the lower extremity of body 1', are provided with slots respectively 24, 25 and 26.

In such a form of embodiment nothing prevents providing extra holes or openings which may or may not correspond to openings 11 to 15 provided in the body according to FIGS. 1 to 8.

It is also perfectly obvious that in such a body according to FIGS. 11 to 13 a space of the type shown at 6 in FIGS. 1–6 and 8 could also be provided, which can be located at the same height with respect to the base of the element, which may be of use when forming corner joints.

In this case body 1' also has a height $h$ which is by preference a multiple of side $h$ of the parallelepipedic body, whereby, in case square elements are used in combination with rectangular elements as is shown in FIGS. 1 to 8, height $h$ shall preferably correspond to the height $h$ of the rectangular element, whilst side $m$ shall preferably correspond to thickness $k$ of the element according to FIGS. 1 to 8.

In this form of embodiment drawer 2' is mainly made-up of a square body 27 in which an opening 28 which may or may not have a bottom is provided, as well as a control rod 29 which passes through a guiding element 30 provided for this purpose in an extension 31 of body 1'. Extension 31 finally has a side $n$ which is equal to or slightly smaller than the inner side $p$ of the corresponding outer wrapping body 1'.

In FIGS. 16 and 17 yet another application is shown of a wrapping element according to the present invention.

In this case outer body 1" is formed practically in the same manner as was the case for the embodiment according to FIGS. 1 to 8, except for the guide passage 18. This opening is in fact not present in this case so that drawer 2" is in fact guided by inner extension 17 itself.

Drawer 2" is in this case also made-up of a hollow prismatic body 32 which is provided at one extremity with an opening 33.

The purpose of such a wrapping is to be able to introduce into drawer 2" a series of articles or products which can for instance be removed from the wrapping one after another by moving drawer 2" in such a way with respect to the body 1" that aforesaid opening 33 becomes free so that each time one product can be removed from the wrapping.

Such a wrapping offers great advantages for instance for instance for the packing or respectively distributing of confectionery goods such as amongst others chewing gum and suchlike.

The use itself of such wrappings, metering apparatus, apparatus for transferring products, such as for instance liquids or suchlike, in other products, also for instance liquids or suchlike has already clearly been described previously.

When the products or suchlike which have been packed by means of wrappings according to the present invention, have been used-up or in other words when the wrapping has been emptied, the internal element or drawer can be separated from the outer body 1, so as to obtain in this manner, on the one hand outer bodies, and on the other hand drawers.

By means of these outer bodies 1 it will subsequently be possible to build-up constructions, or in other words, these outer bodies 1 are built in such a manner as to be able to be assembled to each other in various manners so that they can be used as building blocks for setting-up constructions, whereby such constructions can have an entertainment and/or didactic character, such building elements being particularly intended for children.

In FIGS. 18 to 29 various assembly possibilities are represented of building blocks consisting of the outer part of the wrapping according to the present invention.

In FIG. 18 two bodies 1 are simply placed side by side, whereby the hook-shaped element 16 of one body cooperates with the opening 15 of the body next to it.

FIG. 19 shows in which way two bodies 1 can be attached to each other by superposing them with a sliding fit.

FIG. 20 shows the assembly of two bodies 1, which on the one hand is obtained as in FIG. 18, but where these two bodies are complementarily connected to each other by means of a third body 1 fitted transversally in spaces 6 of the two first mentioned bodies 1.

FIG. 21 shows a connection between a first body 1 and a second body 1 which is placed transversally and whereby the later is simply fitted in space 6 of the first mentioned element 1.

FIG. 22 shows an assembly in which element 16 of one body 1 is fitted in the opening 14 of a second body.

FIG. 23 shows an embodiment in which element 16 of one body 1 is entered into a second body 1 through aforementioned space 6.

FIG. 24 shows the connection by means of which two bodies 1 are fitted together by introducing element 16 of one body in opening 11 of the second body and element 16 of the second body in opening 11 of the first body 1.

FIG. 25 shows an embodiment in which hooks 16 are applied over a fixed part of the second body through the respective spaces 6 of these bodies 1.

FIG. 26 shows a connection in which element 16 of one body is entered into another body 1 by fitting this element through opening or hollow 12 of this second element and conversely.

FIG. 27 shows a connection in which one element 16 of a body 1 is introduced in the second body via opening 12, whilst element 16 of the second body grips around the bottom edge of the first body 1.

These various connections are merely show as examples and it is quite obvious that many further connections are possible.

It would indeed be possible to carry out the connection according to FIG. 20 by placing two bodies 1 next to each other with their hook-shaped element 16 on the outside and to carry out the connection merely by fitting a third body 1 through spaces 6 of the first two bodies, etc.

In FIGS. 28 and 29 a connection is shown between a body 1 and a body 1'

It is perfectly obvious that such connections can be brought about in any appropriate manner and that element 1', or respectively the hook-shaped element 16 of this element 1' can co-operate with each of aforementioned hollows 11 to 15 of body 1.

It is also obvious that aforementioned body 1 can similarly be replaced by a body 1'' and that combinations can eventually be formed of bodies 1 with bodies 1'', with bodies 1', etc. in accordance with the construction one has in mind.

In FIG. 30 a contruction is illustrated, in the present case a fort, which is mainly made-up of bodies 1, respectively 1'', where the corners of such a fort can for instance be made-up of elements 1' and in which the top edge of such a construction can for instance be decorated by making use of the drawers of the wrapping according to the present invention.

FIG. 31 shows a schematic top view of such a construction.

It is quite clear that the presence of aforementioned spaces 6 will permit the fitting of floors in such a construction at the appropriate heights.

We thus obtain a very simple wrapping for doses of products of all kinds, whereby these wrappings can be used after having been emptied as toys for children, more particularly as building elements, in order to form all sorts of constructions.

It is perfectly obvious that the present invention is by no means limited to the previous descriptions or to the forms of embodiment shown in the appended drawings, but can be extended to any wrappings which permit, after having emptied them, to assemble these wrapping bodies to each other in order to obtain building constructions, whereby such wrappings may or may not be fabricated righthand or lefthand.

What I claim is:

1. Combined box and toy including means whereby it is adapted to be interconnected with a similar combined box and toy and comprising: a hollow channel shaped body having a substantially rectangular cross-section and with four side walls, said means including an interruption in the length of three of said walls intermediate their ends over a predetermined length so as to form a slot transverse to the length of said body, said slot having a width substantially equal to the thickness of said body; and a removable drawer with at least one cavity and adapted to slide in said body, said body in a predetermined position being adapted to close said cavity.

2. Combined box and toy according to claim 1, wherein said means includes at least one hook element carried near an extremity of at least one of said side walls, said one hook element adapted to be hooked on one of the side walls adjacent said slot of said other combined box and toy.

3. Combined box and toy according to claim 2, wherein said means further includes at least one of said side walls having at least one aperture in which said hook element may be hooked.

References Cited

UNITED STATES PATENTS

| 228,158 | 5/1880 | Woods | 229—9 |
| 1,932,705 | 10/1933 | Menten | 229—9 X |
| 1,953,418 | 4/1934 | MacDonald | 229—11 X |
| 3,417,910 | 12/1968 | Johnson | 229—9 X |
| 176,228 | 4/1876 | Kayser | 46—11 |
| 1,330,780 | 2/1920 | Bonte | 46—11 UX |
| 1,838,514 | 12/1931 | Zoll | 46—11 X |
| 1,932,368 | 10/1933 | Bowman | 46—11 |
| 3,091,361 | 5/1963 | Gawron | 46—25 UX |
| 3,496,670 | 2/1970 | Sloop et al. | 46—25 |

FOREIGN PATENTS

| 473,012 | 7/1969 | Switzerland | 229—20 |
| 606,224 | 1948 | Great Britain | 46—25 |

F. BARRY SHAY, Primary Examiner

U.S. Cl. X.R.

46—25; 229—9